Oct. 11, 1966  L. R. TRAVIS  3,278,887
ELECTRICAL CIRCUIT ASSEMBLY AND METHOD OF MANUFACTURE
Filed March 16, 1964  4 Sheets-Sheet 1
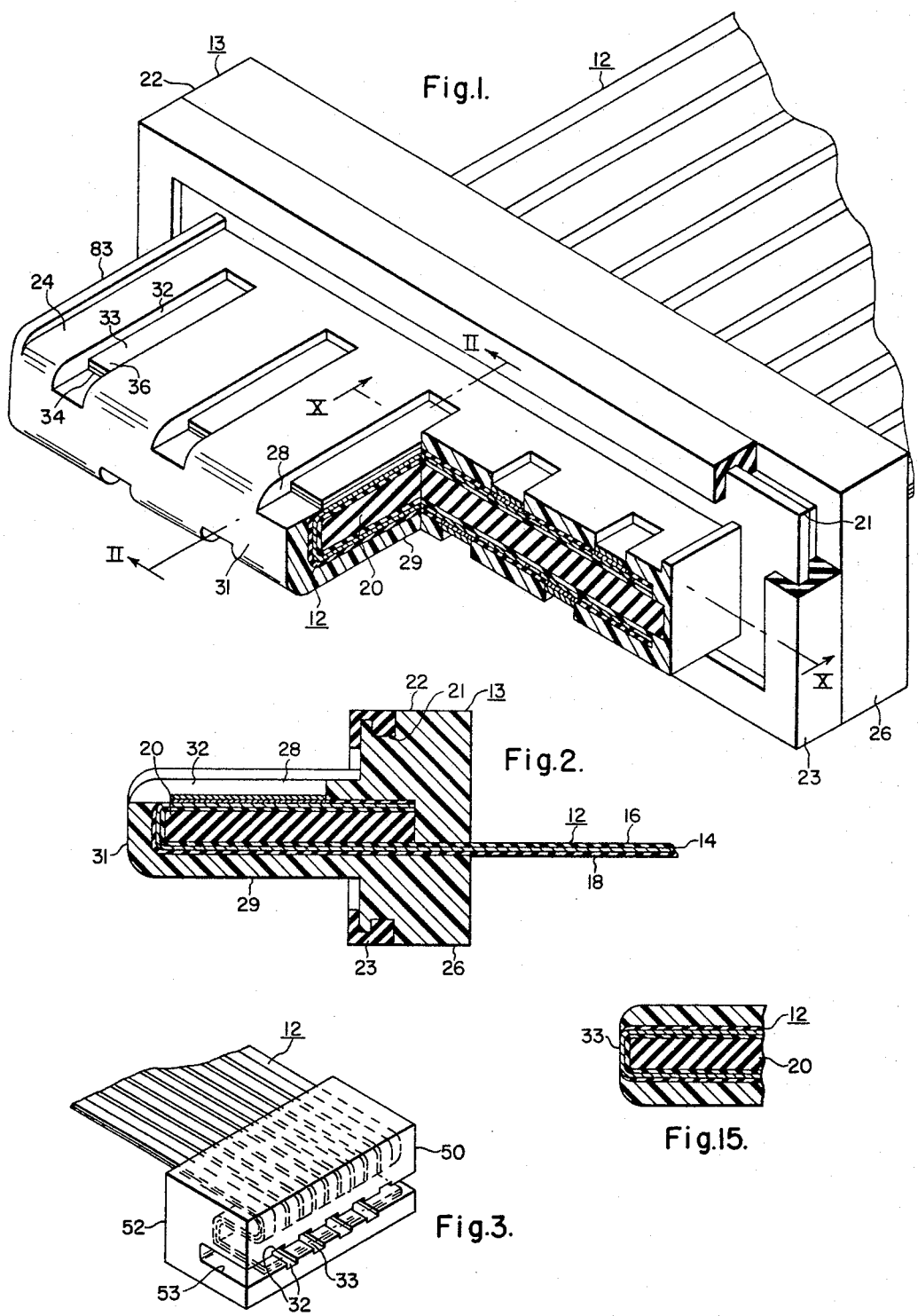

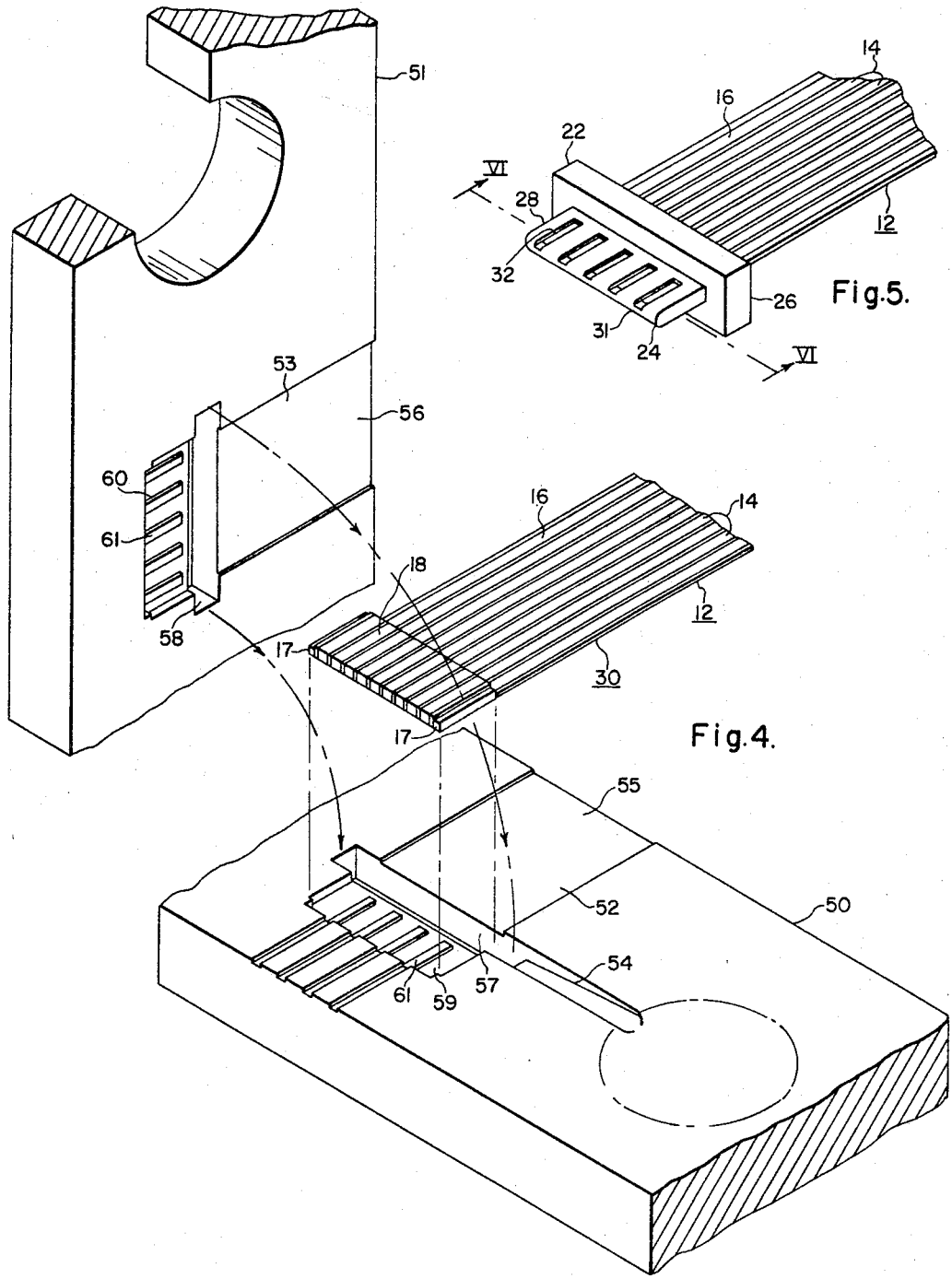

Oct. 11, 1966 L. R. TRAVIS 3,278,887
ELECTRICAL CIRCUIT ASSEMBLY AND METHOD OF MANUFACTURE
Filed March 16, 1964 4 Sheets-Sheet 4

United States Patent Office 3,278,887
Patented Oct. 11, 1966

3,278,887
ELECTRICAL CIRCUIT ASSEMBLY AND
METHOD OF MANUFACTURE
Lawrence R. Travis, Monroeville, Pa., assignor to Westinghouse Electric Corporation, East Pittsburgh, Pa., a corporation of Pennsylvania
Filed Mar. 16, 1964, Ser. No. 352,156
10 Claims. (Cl. 339—176)

This invention relates to electrical circuit assemblies for the termination and connection of flexible electrically conductive and insulated conductors and to methods of manufacturing same.

Flexible electrically conductive circuit assemblies may be provided in the form of electrically conductive circuits or cables with covering insulation. The cable normally is in the form of a plurality of thin separated parallel electrical conductors bonded between a suitable plastic insulation. One of the problems associated with the use of flexible circuits is providing a simple, economical and reliable electrical connection or termination device. The present technique for providing terminations on flat conductor cables requires that the end portion of the electrically conductive members be stripped of insulation, cleaned, and then usually assembled to terminals or connectors. There are other types of connectors or terminating devices available in which the end portion of the flexible cable is stripped of insulation by abrading or grinding the insulating material off the conductor member and then securing the cable into a connector. The removal of insulation from flat conductor cable is generally by mechanical means, such as grinding. Because of tolerance variations in the thickness and parallelism of the conductors, it is extremely difficult to remove the insulation from all of the conductors without at the same time removing some conductor material. This results in residual stresses being imparted to the conductors, which could result in intermittances or open circuits during subsequent handling, mechanical flexing or thermal cycling.

It is accordingly an object of this invention to provide an improved electrical connecting or terminating device.

It is another object to provide an improved method of manufacturing an electrical connecting or terminating device.

It is a more particular object to provide an improved electrical connection for thin flexible cables in which the insulating covering material for the conductive members is removed in a manner so as not to disturb or remove any material from the electrical conductor.

It is another object to provide an improved method of manufacturing electrical connection devices for flexible insulated electrical conductors in which the insulated flexible conductors are provided with a formed connection member and specific areas of the insulating covering material of the flexible conductors are removed by a chemical process such areas subsequently functioning as contacting elements.

Briefly, the present invention accomplishes the above cited objects by providing a connection or terminal for insulated flexible conductors by providing a formed connector member about said conductors and providing openings within the formed member to leave exposed the surfaces of the flexible conductor which are to form the contact areas of the terminal and then removing the insulation covering the contact areas of the terminal to provide an electrical connector for the conductors.

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings, in which:

FIGURE 1 is a perspective view of a circuit assembly device for a flexible cable in accordance with the teachings of my invention;

FIG. 2 is a sectional view taken along the line II—II of FIG. 1;

FIG. 3 is a perspective view of a female terminating device in accordance with the teaching of my invention;

FIG. 4 is a perspective view, in exploded form illustrating the molding or forming step in the assembly operation embodying my invention;

FIG. 5 is a perspective view illustrating the circuit assembly after the forming operation;

FIG. 15 is a sectional view of a butt connector device in accordance with the teaching of my invention;

Figure 10:
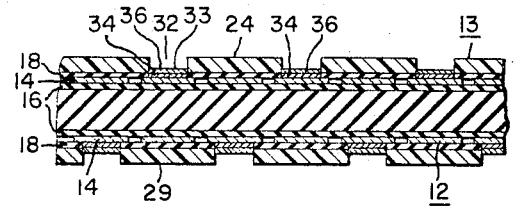
FIG. 10 is a fragmentary sectional view of the connector taken along the line X—X of FIG. 1.

Referring now to FIGS. 1, 2 and 10, there is illustrated a flexible cable connection termination member 13. A flexible conductive cable 12 is comprised of a plurality of elongated electrically conductive elements 14 of a suitable material such as copper sandwiched between two electrically insulating layers 16 and 18 of suitable insulating materials. In the specific embodiment shown, there are nine conductors 14 in the cable 12.

The end of cable 12 is wrapped around a mandrel 20 to provide an insert 30 as indicated in FIG. 4 which is then molded within a termination body 22. The termination body 22 provides a male termination member including an insert portion 24 and a base portion 26. The base portion 26 includes a groove portion 21 which positions and retains a ring or gasket 23 of a suitable material such as rubber.

Figure 16:
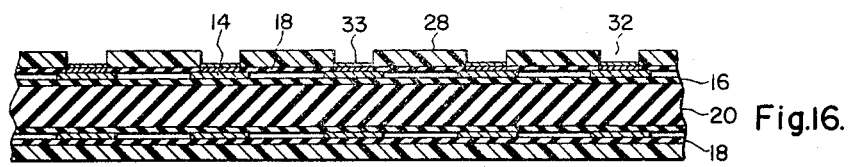
FIG. 16 is a sectional view similar to FIG. 6 of a modified termination circuit assembly in accordance with the teaching of my invention.
Figure 17:
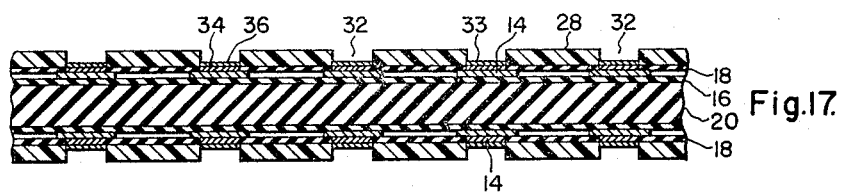
FIG. 17 is a sectional view similar to FIG. 6 of a modified termination circuit assembly in accordance with the teaching of this invention.

The insert portion 24 provides two substantially parallel molded layers 28 and 29 with a molded nose portion 31. Openings or windows 32 are provided in the layers 28 and 29 in alignment with selected conductors 14 in the tape 12. In the specific embodiment shown in FIGURE 1, the upper layer 28 is provided with five openings 32 over five of conductors 14 and the lower layer is provided with four openings 32 over the other four conductors 14 in the cable. By providing alternating exposure of the conductor areas on opposite sides as shown in FIG. 1, one is able to easily provide contact areas for a closely pitched cable. If desired, an opening 32 could be provided to each conductor 14 through only one of the layers 28 or 29 as illustrated in FIG. 16 or an opening 32 could be provided through both layers 28 and 29 to provide redundancy or multiplicity of contact as illustrated in FIG. 17.

The portion of layers 16 and 18 covering the conductors 14 and under the windows 32 is removed and a suitable electrical contact area 33 provided on the copper conductor 14. In the specific embodiment shown in FIG. 1, a layer 34 of nickel is first provided on the copper conductor 14 in the contact area 33 and then a second layer 36 of gold provided on the nickel layer 34.

Referring now in detail to FIGS. 4 and 10, the fabrication of the electrical circuit termination member 13 is described. The conductive cable 12 may be in many forms. In the specific embodiment shown, the tape 12 is made by starting with a copper foil of about 5 to 6 mils in thickness and 1–3 inches in width. The foil is coated on one surface with a suitable insulating material layer 18 such as an aromatic polyimide or aromatic polyamide-imide to provide a thickness of about 1.5 mils. A suitable resist material such as wax, a low melting thermoplastic resin or carbon black pigmented short oil varnish is then provided on the copper foil on those areas where the conductive elements 14 are desired. The portions of the copper foil not protected by resist are then removed by a suitable etchant such as an aqueous solution of ferric chloride to provide the nine parallel conductors 14 about 100 mils in width on a sheet or layer 18. The resist is removed after etching with a suitable cleaner such as a blend of high boiling aromatic and aromatic substituted hydrocarbons with necessary wetting and detergent additions. This procedure provides the conductive elements 14 with one insulating layer 18. The layer 16 may be of a similar material as 18 and applied to cover the conductors 14 with a thickness of about 2 mils. A flexible epoxy adhesive may be used to secure and bond the layer 16 to the conductors 14 and the layer 18. The tape 12 may be constructed in many different ways and it is only necessary that at least one of the layers 16 or 18 be a suitable material that can be removed by a suitable technique. The layer 18 in the specific embodiment is preferably a film of an aromatic polyimide or aromatic polyamide-imide resin and reference is made to the copending application Serial No. 352,163, filed March 16, 1964 by Freeman et al. and assigned to the same assignee for details of flat flexible multiple conductor cables employing the foregoing resins as supporting insulation. Methods of preparing the flat conductor cable are described in the heretofore noted Freeman et al. application and in copending application Serial No. 352,154, filed March 16, 1964, also assigned to the assignee of this invention. Reference may be had thereto for the details of preparation. The preparation of aromatic polymeric imide resins is described in British Patent 903,271 and reference may be made thereto for specific details. The preparation of polymeric amide-imide resins is described in the copending application, Serial No. 295,279, now U.S. Patent No. 3,179,635 assigned to the assignee of this invention and reference may be had there for further details.

Insulating films of aromatic polyimides and polyamide-imide resins can be removed by strong caustic solutions. In the presence of a strong caustic, it is theorized that the imide linkages in the polymer chain are hydrolyzed, resulting in the formation of the salt of the phthalmic acid formed by opening the imide ring. These salts are water soluble and can be easily removed by washing or rinsing with water. The behavior of these aromatic polyimides and polyamide-imides is advantageous in this invention in that they may be rapidly removed by chemical means. Reference may be had to copending application Serial Number 352,155, filed March 16, 1964 assigned to the assignee of this invention for details on materials and techniques for removing aromatic polyimide and aromatic polyamide-imide films. This application and those mentioned heretofore are to be considered as incorporated herein by reference. This invention is not limited to these specific materials or techniques but is applicable to all those insulating materials that may be removed by chemical means and to electrical conductive materials that are not attacked by the chemical removing agent.

The mandrel 20 is about 40 mils in thickness and 1 to 4 inches in length and ¼ inch in width for the specific embodiment shown here. The mandrel 20 is of a suitable insulating material such as molded short fiber glass-filled diallyl phthalate to provide a member of high flexural strength. Small projections or extensions 17 are provided on the mandrel 20 to aid in locating and positioning the tape 12 thereon. The end of the tape 12 is wrapped around the mandrel 20 and bonded thereto by a suitable adhesive such as an epoxy resin adhesive. A pressure of about 5 pounds is applied for 5 minutes to insure good contact. In this manner, the mold insert 30 is formed in which the layer 16 is folded against and in contact with the mandrel 20, and the layer 18 is positioned outwardly. If desired, holes or slots may be provided on the ends of the mandrel to be used initially as positioning devices relative to a specific conductor of the cable and later relative to the window core pins of the molding operation. In this type of construction, layer 16 would not have to be of material capable of removal by the hereinafter described chemical process. The layer 16 could be of another suitable insulating material such as linear polyester films e.g. films of resins such as polyethylene terephthalate. Films of polyethylene, polycarbonates, polyvinyl chloride, polyvinylidene chloride, and polyvinylidence fluoride may also be employed. Films of fluorocarbon resins, e.g. polytetrafluoroethylene or polychlorotrifluoroethylene are also suitable for the layer 16.

In FIG. 4, the mold insert 30 is shown and consists of the end of the cable 12 folded about the mandrel 20. The insulating layers 16 and 18 have not been removed at this time. The mold insert 30 may then be positioned within a suitable molding die.

Figure 6:
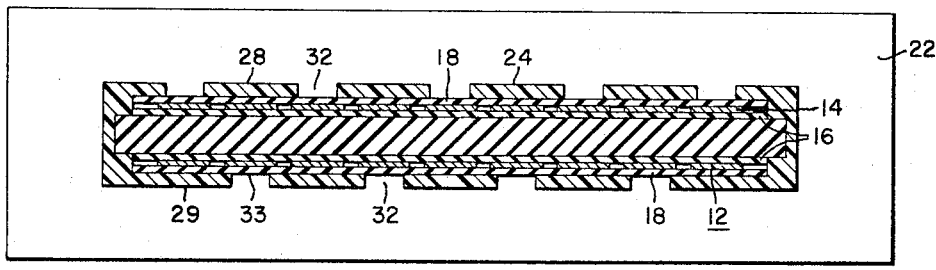
FIG. 6 is a sectional view of the connector taken along line VI—VI of FIGURE 5.

In FIG. 4, there is illustrated a mold cavity comprised of a lower member 50 and an upper member 51. The lower mold facing member 50 and the upper facing member 51 include recessed portions 52 and 53 respectively. The recessed portions 52 and 53 form the mold cavity in which the mold insert 30 is positioned. The mold material is forced through a channel 54 in the face 50 into the mold cavity by suitable transfer molding means. The mold material is a mineral filled epoxy molding compound or a compound of short glass fiber filled diallyl phthalate. In the case of the epoxy compound, material is heated to a temperature of about 325° F. and placed under a pressure of about 250 lbs./sq. inch and forced through the channel 54 into the mold cavity. The material is allowed to set for about three minutes and the member ejected from the mold. The product from the mold is illustrated in FIGURES 5 and 6.

The recessed portion 52 includes a first portion 55 in which the tape 12 is seated. A corresponding recess 56 is provided in the recess 53. When the two faces 50 and 51 are clamped together with the tape 12 therein, the dimensions are such as to provide a substantial seal so that the mold material does not enter into the portion defined by recessed portions 55 and 56.

The recessed portion 52 includes a second portion 57 forming a part of the mold cavity and into which the mold material is forced to define the base portion 26 of the body 2. A corresponding recess 58 is provided in the recess 53.

The recessed portion 52 includes a third portion 59 forming a part of the mold cavity and into which the mold material is forced to define the insert portion 24 of the body 22. A corresponding recessed portion 60 is included within the recess 53. Positioned within the recessed portion 59 are four core pins or projecting portions 61 on which the mold insert 30 rests.

The core pins 61 in recess 59 are positioned to be centered on the second, fourth, sixth and eighth conductors 14 from left to right. Similar core pins 61 are located in recess 60. The core pins 61 in recess 60 are centered over the first, third, fifth, seventh and ninth conductors 14. The core pins 61 seat against the mold insert 30 when the members 50 and 51 are clamped together so that the mold material does not enter the area of the insert against which the core pins 61 are seated. The core pins 61 form the openings 32 in the insert portion 24 of the body illustrated in FIGS. 5 and 6. In the mold illustrated, provision is not made for the groove 21 or projections 83.

Figure 12:
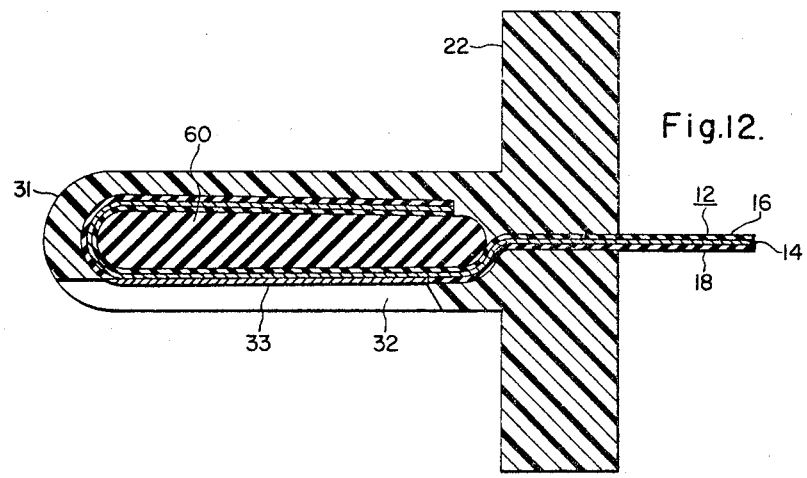
FIG. 12 is a sectional view similar to FIG. 2 of a termination circuit assembly illustrating another embodiment of my invention.

By utilization of the mandrel 20, one is able to improve strain relief, provide for redundancy of contacting or for alternating exposures of conductors areas on opposite sides for closely pitched cables. If desired the tape end may be encapsulated without the use of the mandrel 20. It is also evident that different shaped mandrels may be used. In FIG. 12, there is illustrated a tapered mandrel 60. This configuration permits improved locking of the male member within a female connector.

Figure 7:
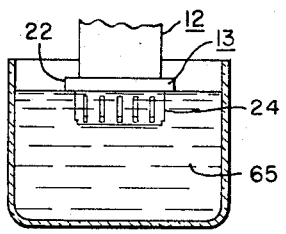
FIG. 7 is a view illustrating the insulation removal operation.
Figure 8:
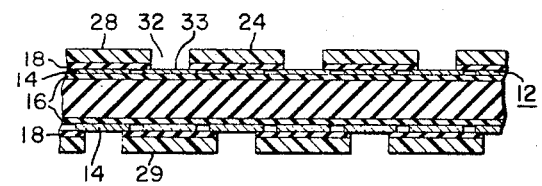
FIG. 8 is a fragmentary sectional view similar to FIG. 6 of the connector after insulation removal.
Figure 9:
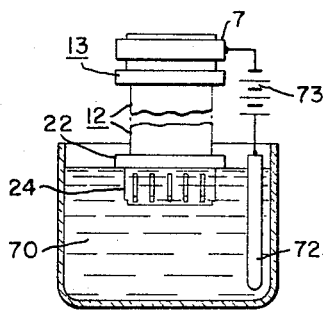
FIG. 9 is a view illustrating the plating operation of contact material onto the contact portions of the connector.

The next step in the assembly of the termination device 13 is to remove portions of the insulating layer 18 corresponding to the area defined beneath the openings 32 to expose contacts 33 on the conductors 14. In FIG. 7, there is illustrated the submersion of the insert portion 24 of the body 22 into a solution 65 of a suitable chemical etchant such as strong aqueous solutions of sodium and/or potassium hydroxide. In one specific embodiment, a 20 percent solution of sodium hydroxide at a temperature of 100° C. for a period of about three minutes was found adequate to remove the insulating layer 18 beneath the openings 32. The resulting product is illustrated in FIG. 8. The caustic solution does not affect the portion of the tape covered by the body 22. It may also be necessary in some procedures to provide a suitable protective coating which is unaffected by the chemical removal agent over the tape extending from the terminating device 13 and adjacent thereto. A polyvinyl chloride solution may be used. The area to be protected may simply be dipped in the polyvinyl chloride solution and then stripped off after the etching treatment. The etching treatment removes the insulating material of layer 18 from beneath the windows and provides the contact areas 33 of the termination device.

The next step in the process is to provide a protective surface in those areas where the insulating coating has been chemically removed from the conductors 14. The coating material may be deposited chemically or electrochemically onto the exposed conductor areas, the only restriction being that in the process the male insulating member and the conductor material must not be detrimentally effected. Such material may be nickel, gold, tin or any other plating material normally used in contacting portions of connectors.

In the specific embodiment, the contact area 33 on the copper conductors is cleaned after the insulation is removed. The insert portion 24 is immersed in a bath 70 of low pH Watts nickel solution and the other terminal connector 13 is connected to a contacting member 71 which provides electrical contact to each of the conductors 14. An anode 72 of a suitable material such as nickel is positioned in the bath 70 and a power supply 73 connected across the contacting member 71 and anode 72 to cause plating of nickel onto the contact 33 to form the layer 34. The gold layer 36 may be deposited by conventional electroplating techniques. The process for depositing a suitable nickel layer 34 is described on pages 340–342 of Metal Finishing Guide Book—directory for 1963. A suitable process for depositing the gold layer 36 is described on pages 305–308 of the above reference.

Another obvious advantage of this technique is that the cost of the material for the precious metal plating is minimized since it is deposited only on the actual functional contacting surface. The cost of removing the insulating material from the cable is negligible, since no additional labor is involved. There are no additional contacting elements involved, since contacting is performed directly to the cable conductors. In this way a complete cable harness system can be produced at a low cost. The simplicity of manufacture serves to enhance the reliability of the system since there are no mechanical forces during insulation removal on the fragile conductor termination which might lead to an open circuit or intermittencies. Further, there are no additional contacting hardware elements which would require handling of these fragile conductor terminations during assembly and junctioning. A further increase in the reliability of the system results from the reduction of assembly errors due to reduction of assembly operations. The reliability of this system is further increased by the elimination of a junction point in each conducting path. Finally, the termination is compatible with rough handling.

The structure illustrated in FIGURE 1 is a male connector. In FIG. 3, there is illustrated a female connector 50. The connector 50 is fabricated by molding the tape 12 into a body 52 as illustrated. Here again as in FIG. 1, the openings 32 are provided over alternate connectors so that five contacts 33 are provided on the upper surface of the recessed portion 53 and four are provided on the lower surface. FIGURE 15 illustrates a butt type of connector 84 wherein the tape 12 is folded around a mandrel 20. The contacts 33 are provided on the end surface 82 by molding around the tape and mandrel 20 and then removing the insulating layer as described with respect to FIG. 1. The termination devices can be made to assume a variety of shapes, including one similar to a printed circuit board, so as to be compatible with conventional female card-edge connector receptacles.

Figure 13:
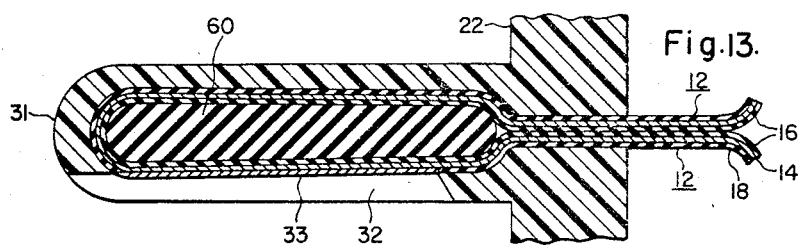
FIG. 13 is a sectional view similar to FIG. 2 of a connector circuit assembly illustrating another embodiment of my invention.

It should also be noted that conductor take-offs at cable points other than at the ends may be easily accomplished by folding the cable at the desired take-off position and manufacturing a connector as on the cable ends. FIG. 13 illustrates how the connector could be formed about the cable 12 at a point other than at the ends of the cables 12. The method of manufacture is similar to that already described with respect to FIGURE 1.

Figure 14:
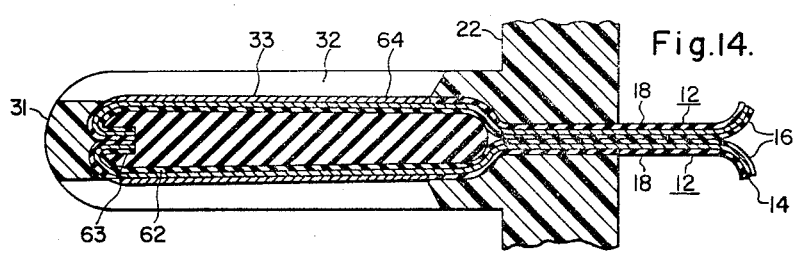
FIG. 14 is a sectional view similar to FIG. 2 of a termination circuit assembly for two flat conductor cables illustrating another embodiment of my invention.

FIG. 14 illustrates another modification in which the ends of two tapes are terminated in a single connector. A mandrel 62 is provided with a recessed portion 63 into which the ends of the tapes 12 may be seated to provide additional mechanical strength. This structure provides a contact 33 for each conductor 14. Only a single layer 64 of protective contact material is shown on the conductor 14.

Figure 11:
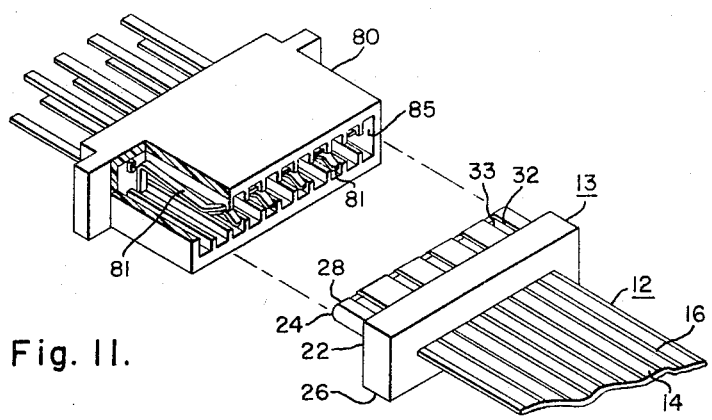
FIG. 11 is a perspective view, partly in section, illustrating the male terminating circuit assembly and an associated female connector.

In FIG. 11, there is illustrated a female connector receptacle 80 that may be used in conjunction with the male connector 13. The receptacle 80 includes five spring members 81 which engage the upper contacts 33 of connector 13. The spring members 81 also project from the back of the receptacle 80 and may be secured to conventional conductors by well known techniques. Four spring members 81 are also provided for the lower contacts 33 on the connector 13.

The insert portion 24 is inserted into the receiving portion of receptacle 80. The ring 23 illustrated in FIG. 1 will press against the connector 80 to provide a interfacial seal. In addition, clamping members (not shown) may be provided to lock the connectors 80 and 13 together. It is also desirable to provide polarizing means on the connectors 13 and 80 to insure that they are inserted correctly. The ridge portion 83 on FIG. 1 is provided on the top surface of connector 13 and a corresponding groove 85 on receptacle 80 insure proper insertion.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

I claim as my invention:

1. An electrical circuit assembly comprising a flexible conductive member covered with aromatic polyamide-imide resin, a formed insulating member molded to and substantially surrounding only a portion of said conducting member to provide an electrical connector, said formed connector member including a molded opening provided over said conductive member with said insulating covering material removed from the conductive member only in an area corresponding to said opening in said formed connector member.

2. An electrical circuit assembly comprising a circuit component including a portion having a plurality of flexible conductive members covered with first insulating material capable of removal by chemical action, a formed connector member of a second insulating material different than said first insulating material to provide an electrical connector, said formed connector resistive to chemical etch said formed connector member including a formed opening provided over each of said conductive members with said first insulating material removed by chemical action from the conductive members only in the area corresponding to said opening.

3. An electrical circuit assembly comprising flexible tape conductor including a plurality of parallel coplanar conductors covered with a first insulating material capable of removal by chemical action, a formed insulating member of a material resistive to chemical etch substantially surrounding a portion of said conducting member to provide an electrical connector for said tape, said formed connector member including a plurality of openings with one opening provided over each of said conductors with said first insulating covering material removed by chemical action from the conductor only in the area corresponding to said opening.

4. The method of manufacturing an electrical circuit assembly comprising the steps of providing a flat flexible circuit cable having a plurality of substantially coplanar conductors covered with a first insulating material capable of removal by chemical process, folding said cable over a mandrel having a first and second surface to provide a first and second cable portion on said first and second surface, forming an insulating connection body about said first and second cable portions, said connection body resistant to chemical process, providing a plurality of openings in said body over selected conductors and removing the insulating material from beneath said openings by a chemical process to expose said conductors.

5. The method of manufacturing an electrical circuit assembly comprising the steps of providing a flat flexible circuit component having a plurality of substantially coplanar conductors and provided with a layer of an aromatic polyimide resin forming an insulating body of a material resistant to a caustic solution about a portion of said circuit component, and providing a plurality of openings therein over selected conductors and removing the resin from beneath said openings by treatment with said caustic solution to expose said conductors.

6. The method of manufacturing an electrical circuit assembly comprising the steps of providing a flat flexible circuit component having a plurality of substantially parallel coplanar conductors and a layer of first insulating material on one side of said conductors and a layer of a second insulating material susceptible to chemical action on the other side of said conductors, folding said circuit component about a mandrel to provide said first layer adjacent said mandrel, molding an insulating body of a material resistant to chemical action about a portion of said circuit component, providing a plurality of openings over said layer of second insulating material and over selected conductors and removing said layer of second insulating material from beneath said openings by said chemical action to expose said conductors.

7. The method of manufacturing an electrical circuit assembly comprising the steps of providing a flat flexible circuit of a resinous insulating film and a plurality of electrical conductor therebeneath, forming an insulating connector body of a material resistant to chemical reagent about a portion of said circuit to provide a plurality of openings therein over selected electrical conductors and removing the resinous material beneath said openings by treatment with said chemical reagent to provide electrical contacts.

8. The method of claim 7 in which said resinous insulating film is a film of an aromatic polyamide-imide resin.

9. The method of claim 7 in which said chemical reagent is an aqueous solution containing at least about 10% of sodium hydroxide, by weight.

10. The method of claim 7 in which the resinous insulating film is derived from the reaction of pyromellitic dianhydride and a diaminobenzanilide.

References Cited by the Examiner

UNITED STATES PATENTS

| 2,994,059 | 7/1961 | Dahlgren et al. | 339—17 X |
| 3,154,365 | 10/1964 | Crimmins | 339—176 |
| 3,164,716 | 1/1965 | Schenker et al. | |
| 3,188,601 | 6/1965 | De Tar | 339—176 X |
| 3,189,864 | 6/1965 | Angele et al. | 339—176 |

EDWARD C. ALLEN, *Primary Examiner.*

W. DONALD MILLER, PATRICK A. CLIFFORD,
*Examiners.*